United States Patent
Shimada et al.

(10) Patent No.: US 7,023,571 B2
(45) Date of Patent: Apr. 4, 2006

(54) IMAGE PROCESSING APPARATUS AND METHOD

(75) Inventors: Bungo Shimada, Tokyo (JP); Hiroshi Sumio, Tokyo (JP); Hirohiko Ito, Yokohama (JP); Nobuaki Miyahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 10/900,316

(22) Filed: Jul. 28, 2004

(65) Prior Publication Data

US 2004/0263897 A1 Dec. 30, 2004

Related U.S. Application Data

(62) Division of application No. 09/337,041, filed on Jun. 28, 1999, now Pat. No. 6,980,310.

(30) Foreign Application Priority Data

Jun. 30, 1998 (JP) .................................. 10-185017

(51) Int. Cl.
G06F 15/00 (2006.01)
B41J 29/393 (2006.01)
G03G 15/00 (2006.01)

(52) U.S. Cl. ...................... 358/1.14; 358/1.13; 347/19; 347/40; 399/75

(58) Field of Classification Search ............... 358/434, 358/437, 1.14, 1.13, 443; 347/19, 40; 399/75, 399/85, 88; 375/343; 370/497; 379/215.01
See application file for complete search history.

(56) References Cited

U.S. PATENT DOCUMENTS

| | | | | |
|---|---|---|---|---|
| 5,095,369 A | | 3/1992 | Ortiz et al. ................. 358/296 |
| 5,623,675 A | * | 4/1997 | Mizuki ....................... 710/260 |
| 5,717,840 A | | 2/1998 | Pardo .......................... 395/112 |
| 5,822,084 A | | 10/1998 | Hwang ....................... 358/437 |
| 5,974,232 A | * | 10/1999 | Kamiya ...................... 709/238 |
| 6,122,073 A | | 9/2000 | Miyasaka et al. ........... 358/434 |
| 6,234,597 B1 | | 5/2001 | Suzuki et al. .................. 347/7 |
| 6,281,980 B1 | | 8/2001 | Maemura et al. .......... 358/1.14 |
| 6,466,326 B1 | * | 10/2002 | Shima ....................... 358/1.12 |

FOREIGN PATENT DOCUMENTS

JP 6-3907 1/1994

* cited by examiner

*Primary Examiner*—Kimberly Williams
*Assistant Examiner*—Saeid Ebrahimi-Dehkordy

(74) *Attorney, Agent, or Firm*—Fitzpatrick, Cella, Harper & Scinto

(57) ABSTRACT

A method to enhance the copy or printout efficiency and decrease the number of output jobs that are abandoned because of undesirable outputs. Abort of output due to absence of sheets or staples, overload of a delivery tray, or the like is predicted. If output abort is determined, data is removed from an output queue and re-registered as an output reserve job at the end of the queue.

28 Claims, 10 Drawing Sheets

# IMAGE PROCESSING APPARATUS AND METHOD

This is a divisional application of U.S. patent application Ser. No. 09/337,041, filed on Jun. 28, 1999, now U.S. Pat. No. 6,980,310.

BACKGROUND OF THE INVENTION

1. Field of the Invention

The present invention relates to an image processing apparatus such as a copying machine, facsimile, or printer, and an image processing method which can be implemented in the apparatus.

2. Description of the Related Art

In the event of short supply of sheets or staples, overload of the delivery tray, or the like, conventional copying machines and printers abort current output jobs.

In many cases, copying machines and printers are shared by a plurality of users. If a copying machine or printer stops upon aborting an output job, other output jobs cannot be executed, resulting in troubling other users.

SUMMARY OF THE INVENTION

The present invention has been made to solve the conventional drawbacks, and has as its object to provide an image processing apparatus capable of realizing high print efficiency without being influenced by job abort.

To achieve the above object, an image processing apparatus according to the present invention is characterized by comprising detection means for detecting the state of a resource used to output an image, prediction means for predicting abort/non-abort of output of image data in accordance with the state of the resource detected by the detection means, output means for suspending output of image data, abort for which is predicted by the prediction means, and storage means for storing output image data when the output means is suspended.

When second image data to be output exists in addition to first image data, and abort for which is predicted, the output means preferably outputs the second image data preferentially to the first image data.

The output means preferably comprises selection means capable of selecting whether output of image data, abort for which is predicted, is suspended or forcibly performed.

The image processing apparatus preferably further comprises instruction means capable of instructing the selection means to suspend or forcibly perform output of image data, when abort is predicted.

The image processing apparatus preferably further comprises display means for displaying an abort prediction result by the prediction means.

When output of image data is suspended, a display means preferably displays a message indicative thereof.

The output means preferably comprises output cancel means for cancelling output of output-suspended image data.

The image processing apparatus preferably further comprises setting means capable of setting a selection result of the selection means in advance.

The image processing apparatus preferably further comprises verification means for verifying setting by the setting means.

An image processing method according to the present invention is characterized by comprising a storage step of storing image data, a detection step of detecting a state of the resource used to output the image data stored in the storage step, a prediction step of predicting abort/non-abort of output of the image data in accordance with the state of the resource detected in the detection step, and a suspension step of suspending output of the image data, abort of which is predicted in the prediction step.

An image processing method according to the present invention is characterized by comprising a storage step of storing image data, a suspension prediction step of comparing the resources necessary for output with the actual resources avairable for first image data to be outputted first out of image data that is stored in the storage step and are to be outputted, and predicting abort/non-abort of output of the first image data from the comparison result, and an output order change step of, when abort of output is predicted in the abort prediction step, changing the output order so as to output the first image data after second image data which was scheduled to be output after the first image data.

The abort prediction step is performed only when image data to be output in addition to the first image data exists, and the first image data is directly output when no image data to be output in addition to the first image data exists.

A computer-readable memory according to the present invention is characterized by comprising a program module of a detection step of detecting a state of a resource used to output image, a program module of a prediction step of predicting abort/non-bort of output of image data in accordance with the state of the resource detected in the detection step, and a program module of an output step of suspending output of image data, abort for which is predicted in the prediction step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described below in detail with reference to the accompanying drawings. The relative arrangement of constituent elements or program modules and numerical values of resolution and the like are not limited to these embodiments unless otherwise specified.

[First Embodiment]

An image processing system to which an image processing method according to the present invention is applied will be described as the first embodiment of the present invention. In this image processing system, when image data received by a facsimile or image data inputted by a computer or scanner is to be output, whether or not an abort is likely to occur due to shortage of a resource necessary for the output is predicted to improve poor print efficiency caused by an abort.

Figure 1:
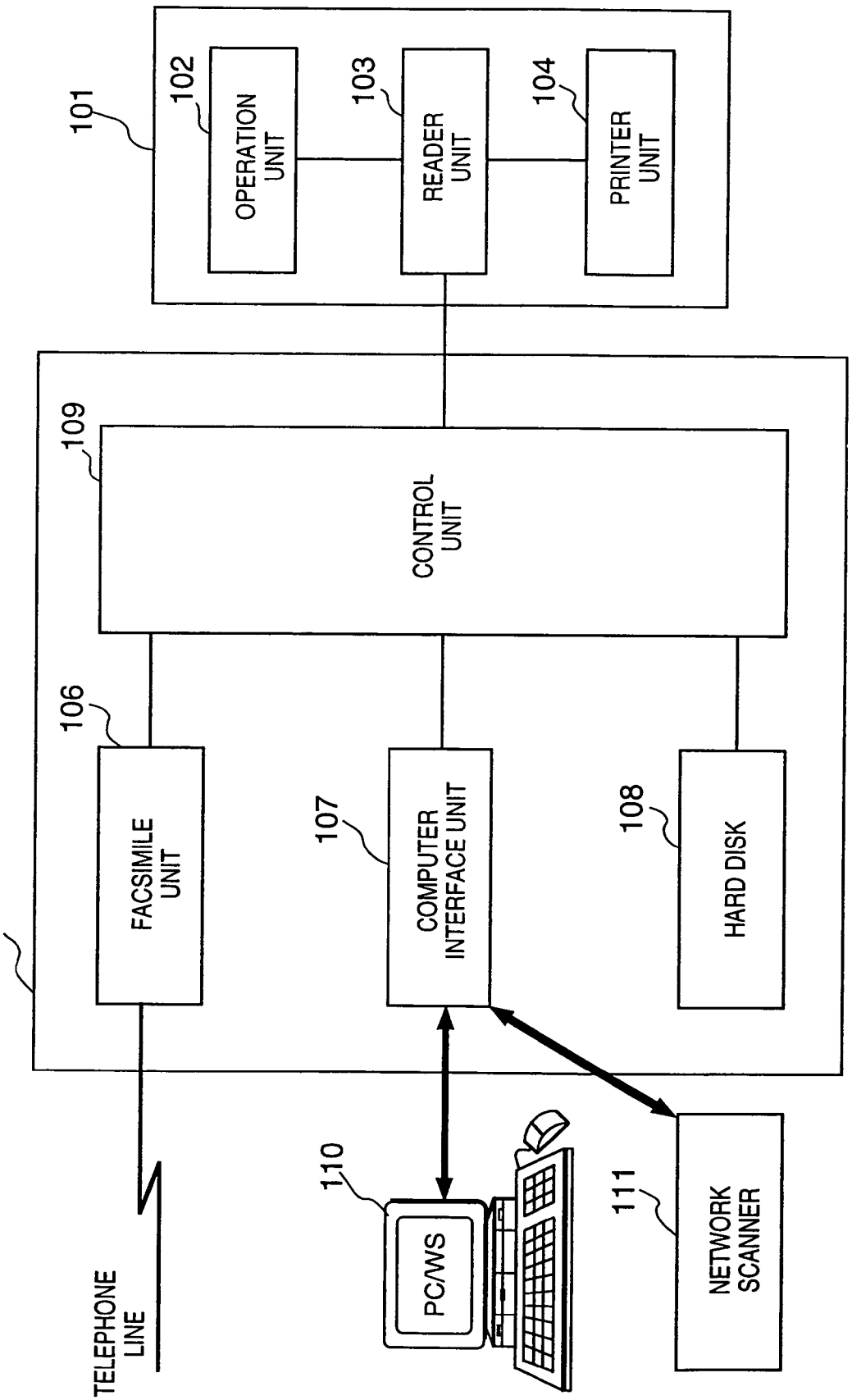
FIG. 1 is a block diagram of a schematic arrangement of an image processing system as the first embodiment according to the present invention.

FIG. 1 is a block diagram showing an arrangement of an image processing system. In FIG. 1, reference numeral 101 denotes a digital copying machine main body including an operation unit 102, reader unit 103, and printer unit 104. The digital copying machine 101 is connected to an image input/output control unit 105, and together constitute a hybrid machine.

The operation unit 102 is used to operate the digital copying machine main body 101 and image input/output control unit 105, and operates as a user interface means for communicating with a user.

The reader unit 103 reads an original image and outputs image data corresponding to the original image to the image input/output control unit 105. The image data output to the image input/output control unit 105 is temporarily stored in a hard disk 108 via a control unit 109.

The printer unit 104 prints, on a print sheet, an image corresponding to image data read from the hard disk 108 via the control unit 109.

The image input/output control unit 105 is connected to the copying machine 101, and includes a facsimile unit 106, computer interface unit 107, hard disk 108, and control unit 109.

The facsimile unit 106 expands compressed image data received via a telephone line to transfer the expanded image data to the control unit 109, and compresses image data transferred from the control unit 109 to transmit the compressed image data via the telephone line. Compressed image data received by the facsimile unit 106 can be temporarily stored in the hard disk 108.

The computer interface unit 107 is interposed between a personal computer/work station (PC/WS) 110 or a network scanner (a image scanner on a network) 111 and the control unit 109. The computer interface unit 107 maps code data (PDL) representing an image that is transferred from the PC/WS 110 and image data from the network scanner 111 into image data which can be printed by the printer unit 104, and stores the image data in the hard disk 108 via the control unit 109.

The control unit 109 controls data flows between the reader unit 103, facsimile unit 106, computer interface unit 107, and hard disk 108, and comprises a CPU such as a microprocessor, a program memory storing control programs corresponding to processes (to be described later), a RAM used as a work area by the CPU upon operation, and the like.

Figure 2:
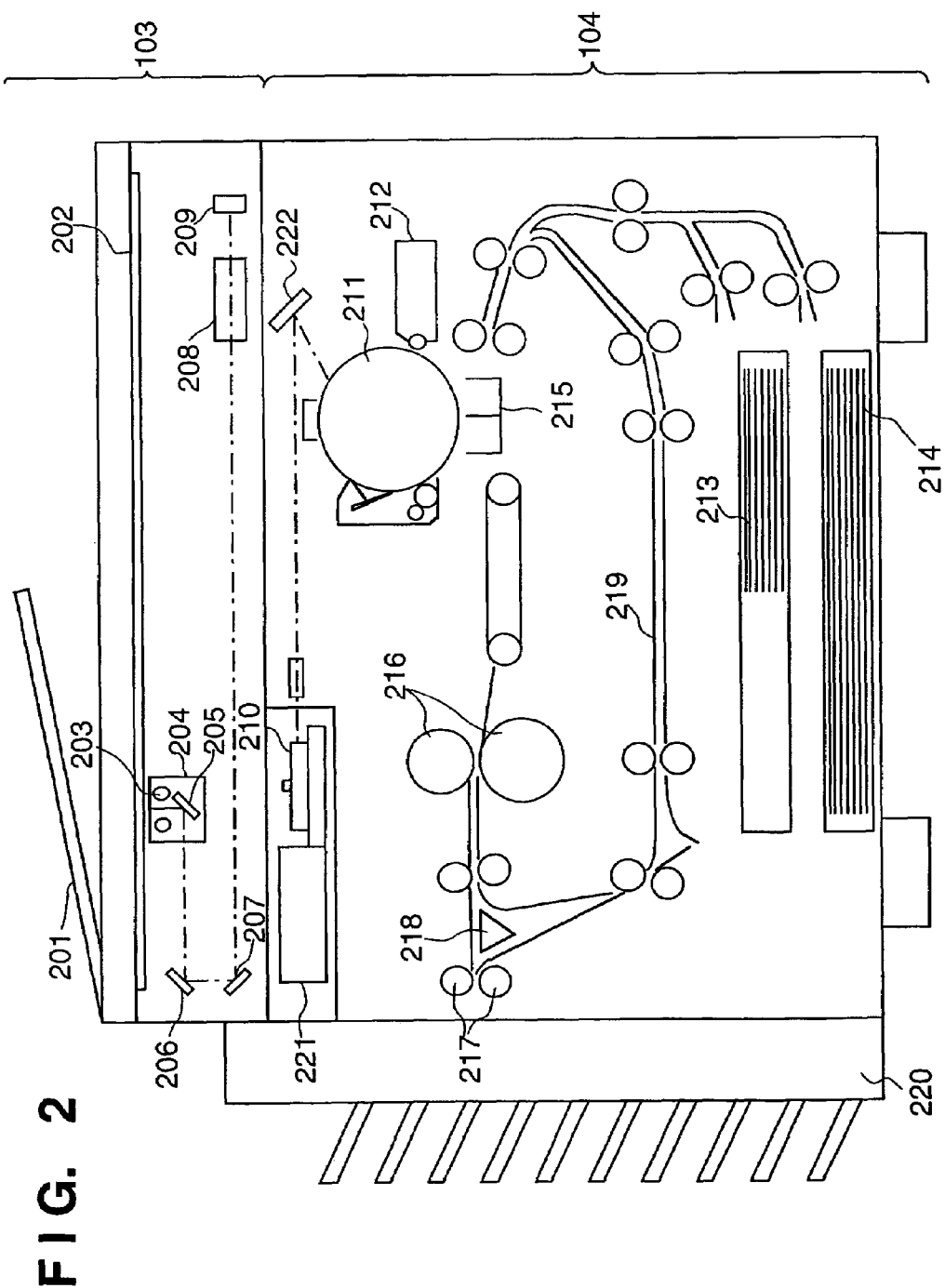
FIG. 2 is a sectional view of a reader unit 103 and printer unit 104 in FIG. 1.

FIG. 2 is a sectional view showing the reader unit 103 and printer unit 104. An original feeder 201 of the reader unit 103 feeds originals, from the last page, onto a platen glass 202 one by one, and discharges originals to the platen glass 202 upon completion of a read of the originals. When an original is conveyed onto the platen glass 202, a lamp 203 is turned on, and a scanner unit 204 starts moving to expose and scan the original. At this time, light reflected by the original is guided to a CCD image sensor (to be referred to as a CCD hereinafter) 209 by mirrors 205, 206, and 207 and a lens 208. The image of the original is read by the CCD 209, and image data output from the CCD 209 is subjected to predetermined processing and transferred to the control unit 109 of the image input/output control unit 105.

A laser driver 221 of the printer unit 104 drives a laser-emitting unit 210 and causes the laser-emitting unit 210 emit a laser beam corresponding to image data output from the image input/output control unit 105. The laser beam irradiates a photosensitive drum 211 to form a latent image corresponding to the laser beam on the photosensitive drum 211. A developing agent is attached to the latent image portion of the photosensitive drum 211 by a developing unit 212. At the timing synchronized with the irradiation start of the laser beam, a print sheet is fed from either cassette 213 or 214 and conveyed to a transfer unit 215, and the developing agent attached to the photosensitive drum 211 is transferred to the print sheet. The print sheet having the developing agent is conveyed to a fixing unit 216 where the developing agent is fixed to the print sheet by heat and pressure of the fixing unit 216.

The print sheet having passed through the fixing unit 216 is discharged by discharge rollers 217. A sorter 220 stores discharged print sheets in its respective bins to sort the print sheets, or staples the sorted print sheets. If no sorting is set, the sorter 220 stores print sheets in a top bin. When double-sided printing is set, a print sheet is conveyed up to the discharge rollers 217, and the rotational direction of the discharge rollers 217 is reversed to guide the print sheet to a refeed convey path 219 by a flapper 218. When multiple printing is set, a print sheet is guided to the re-feed convey path 219 by the flapper 218 so as not to convey the print sheet to the discharge rollers 217. The print sheet guided to the re-feed convey path 219 is fed to the transfer unit 215 at the above-described timing.

The cassettes 213 and 214 are equipped with remaining sheet amount sensors, and the sorter 220 is equipped with a remaining staple amount sensor and delivery tray stack amount sensor (none of them are shown). These sensors monitor the states of corresponding resources.

Figure 3:
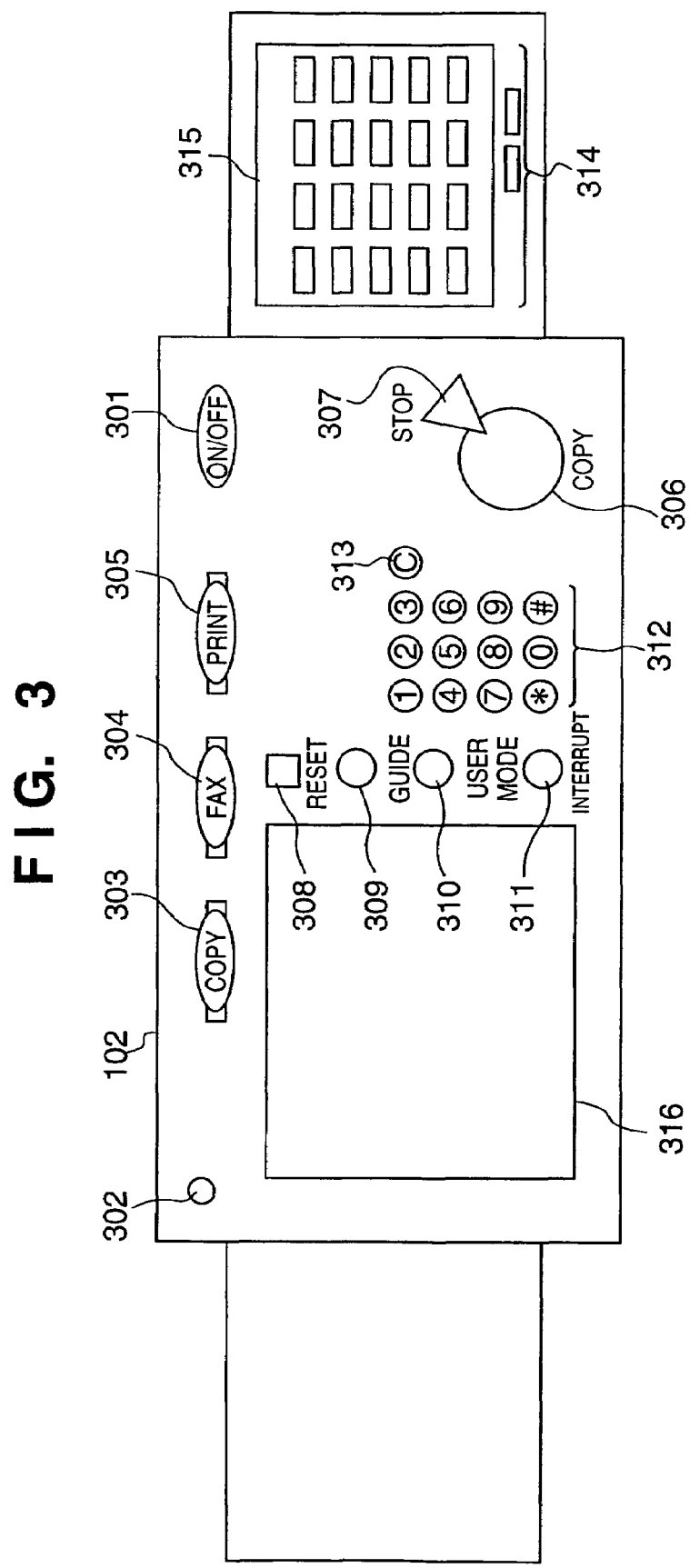
FIG. 3 is a plan view of the outer appearance of an operation unit 102 in FIG. 1.

FIG. 3 shows the key layout of the operation unit 102 of the digital copying machine. Reference numeral 301 denotes a main power lamp which is turned on upon power ON operation. A power switch (not shown) is attached to the side of the main body to control energization to the main body. Reference numeral 302 denotes a preheating key used to set/reset a preheating mode; 303, a copy mode key used to select a copy mode from a plurality of functions; 304, a FAX mode key used to select a FAX mode from a plurality of functions; 305, a print key used to display setting of functions or a print status when the copying machine is used as a printer; and 306, a copy start key used to instruct the start of copy.

Reference numeral 307 denotes a stop key used to cancel or stop coping operation; 308, a reset key used to return to a standard mode during a standby state; 309, a guide key which allows the user to informs the function of each key; 310, a user mode key which the user uses to change the basic setting of the system; 311, an interrupt key used to perform interrupt copy during copy; 312, a tenkey pad used to input numerical values; 313, a clear key used to clear the inputted numerical values; 314, 20 one-touch dial keys used to dial by one-touch operation for facsimile transmission; and 315, a pair of lids as double lids hollowed in accordance with the key shapes of the respective one-touch dial keys 314. A sensor switch (not shown) detects a first state in which the two lids are closed, a second state in which only one lid is open, and a third state in which the two lids are open. Key operation of the one-touch dial keys 314 is determined by a combination with the three types of lid open/close states, which yields the same effect as 20×3=60 keys. Reference numeral 316 denotes a touch panel which is formed by a combination of a liquid crystal display and touch sensor, displays a setting display separately for each mode, and allows various detailed settings by touching displayed keys.

Control procedures according to the present invention will be described with reference to FIGS. 4 to 7.

Figure 4:
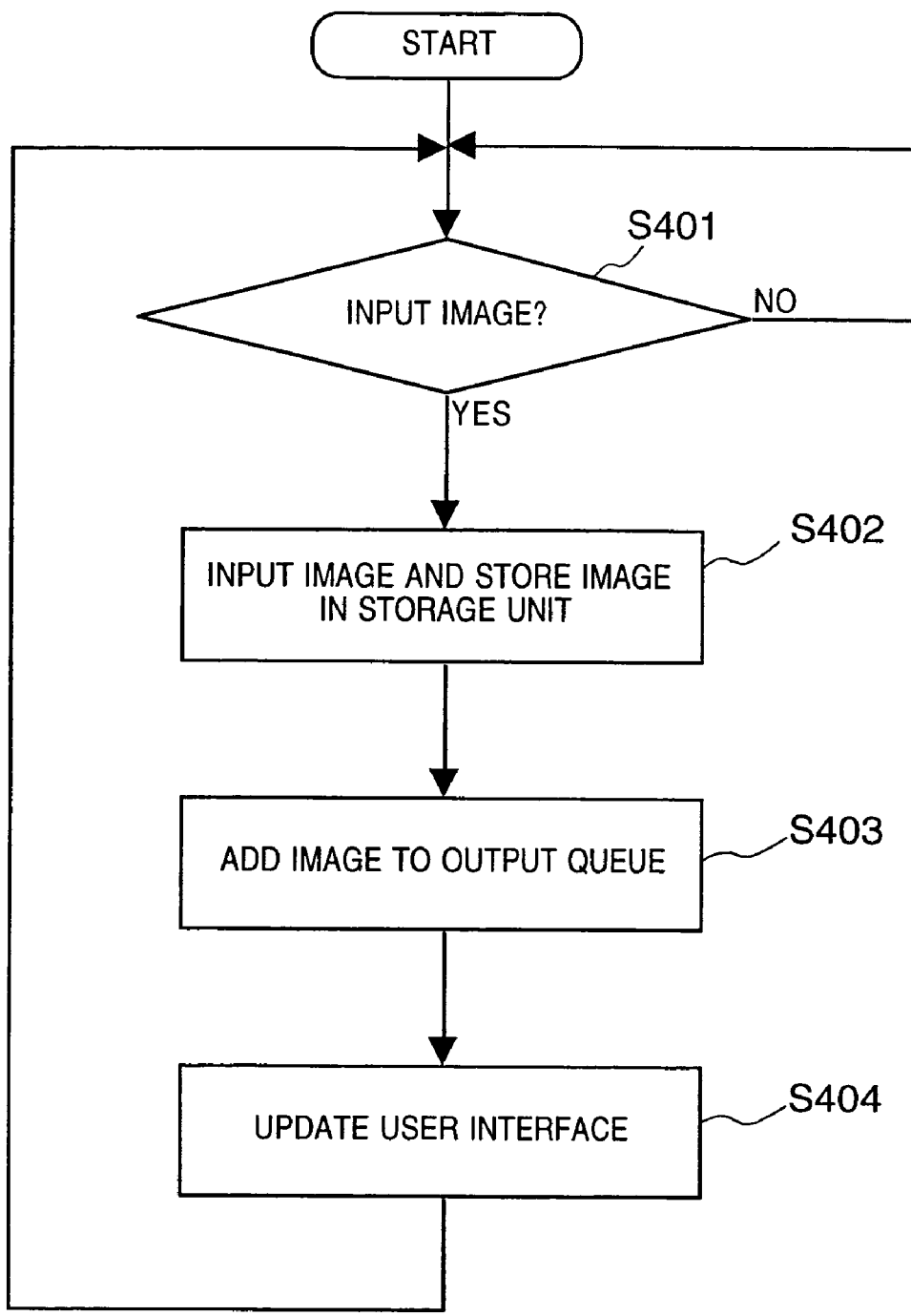
FIG. 4 is a flow chart of an image input control procedure in the first embodiment of the present invention.

FIG. 4 is a flow chart of an image input control procedure. In S401, an image input processing request from the reader unit 103, facsimile unit 106, or computer interface unit 107 is monitored. If an image input processing request occurs in S401, the flow shifts to S402. The inputted image is stored in the hard disk 108 in S402, and added to an image output queue in S403. In S404, the liquid crystal display 316 of the operation unit 102 displays that an image has been inputted, and the personal computer/work station (PC/WS) 110 is informed of this via the computer interface unit 107. Then, the personal computer/work station (PC/WS) 110 displays that an image has been input. The flow returns to S401 to monitor an image input request.

Figure 5:
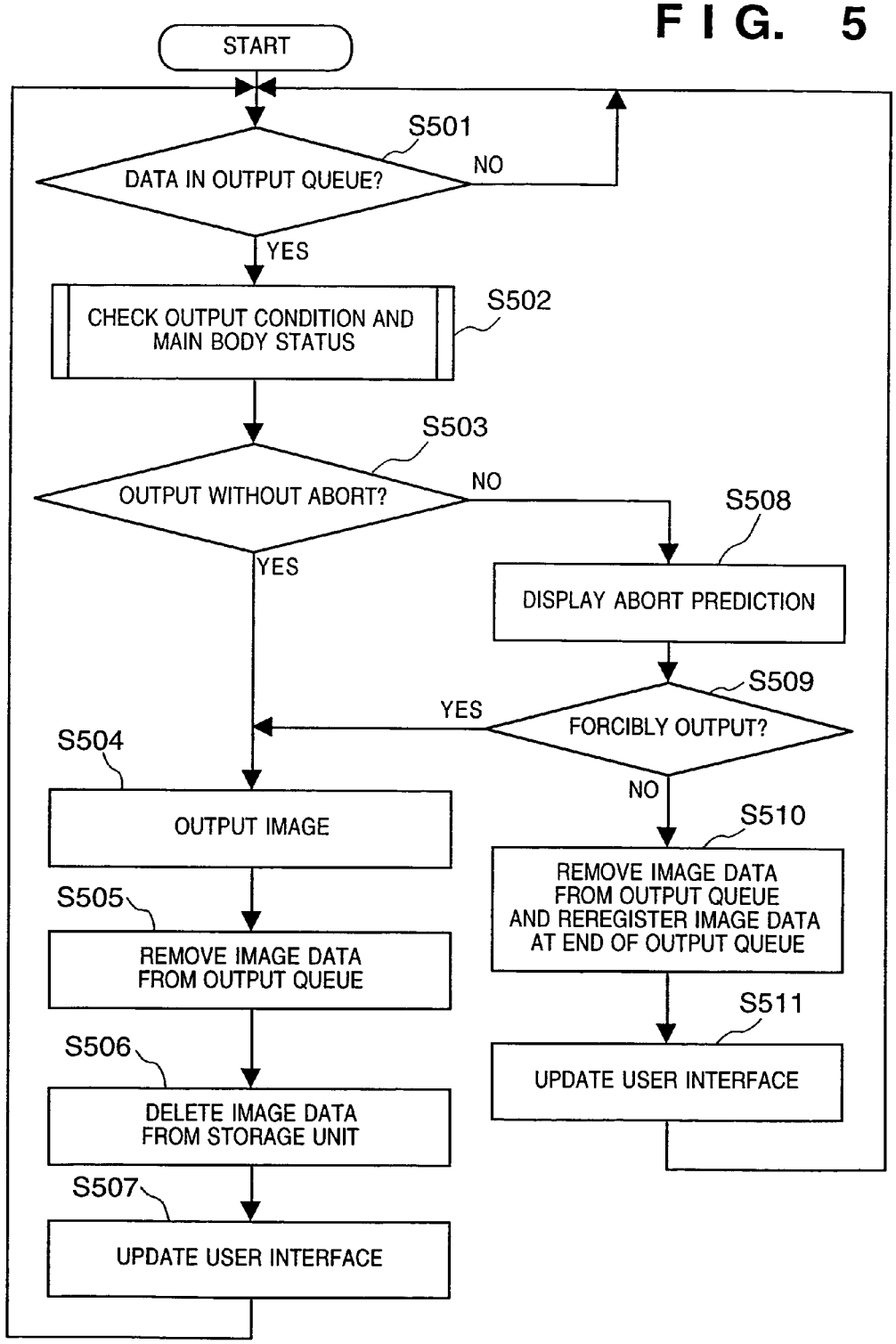
FIG. 5 is a flow chart of an image output control procedure in the first embodiment of the present invention.

FIG. 5 is a flow chart showing an image output control procedure. In S501, data added to the image output queue in S403 is monitored. If data exists in the queue, the flow advances to S502 to check the output conditions of the image data to be output and a main body status. In S503, it is checked based on data in S502 and the detection results of various sensors whether abort of output is likely to occur due to the lack of staples or sheets, stack-over of the delivery tray, or the like. Details in S502 and S503 will be explained in an output prediction control procedure in FIG. 7.

If YES in S503, the flow shifts to S504; if NO, to S508. If the flow shifts to S508, a message indicating output abort, and the reason of abort (which resource is short, or the like) is displayed. The personal computer/work station (PC/WS) 110 is also informed of this status via the computer interface unit 107. At the same time, a user input designating whether to forcibly output the job, abort for which is predicted, or wait (S509). If there is no input upon the lapse of a predetermined time (e.g., 10 sec), the flow advances to S510 to extract the data from the image output queue and re-register it as an output reserve job at the end of the queue.

The flow shifts to S511 to display a message which indicates that output of the image has been postponed because output abort of the image is determined, and includes the reason for abort on the liquid crystal display 316 on the operation unit 102. The personal computer/work station (PC/WS) 110 is also informed of this status via the computer interface unit 107. The personal computer/work station (PCIWS) 110 displays the reason of output abort of the output image, and the current output job. The flow returns to S501 to monitor output data. If YES in S509, the flow shifts to S504.

If the flow shifts to S504, image data at the start of the queue is outputted. If the flow shifts from S509 to S504 and the output operation aborts during the outputting of the image, this status is displayed, informed, and warned to request replenishment of a corresponding resource. If it is confirmed that the user has replenished the short resource, the flow restarts the output and shifts to S505 upon completion of the image output job.

The output data is removed from the output queue in S505, and the stored image data is deleted from the hard disk 108 in S506. The flow advances to S507 to display a message indicative of the image output on the liquid crystal display 316 on the operation unit 102. The personal computer/work station (PC/WS) 110 is informed of image output via the computer interface unit 107. The personal computer/work station (PC/WS) 110 displays a message to this effect. The flow returns to S501 to monitor an image output request.

Figure 6:
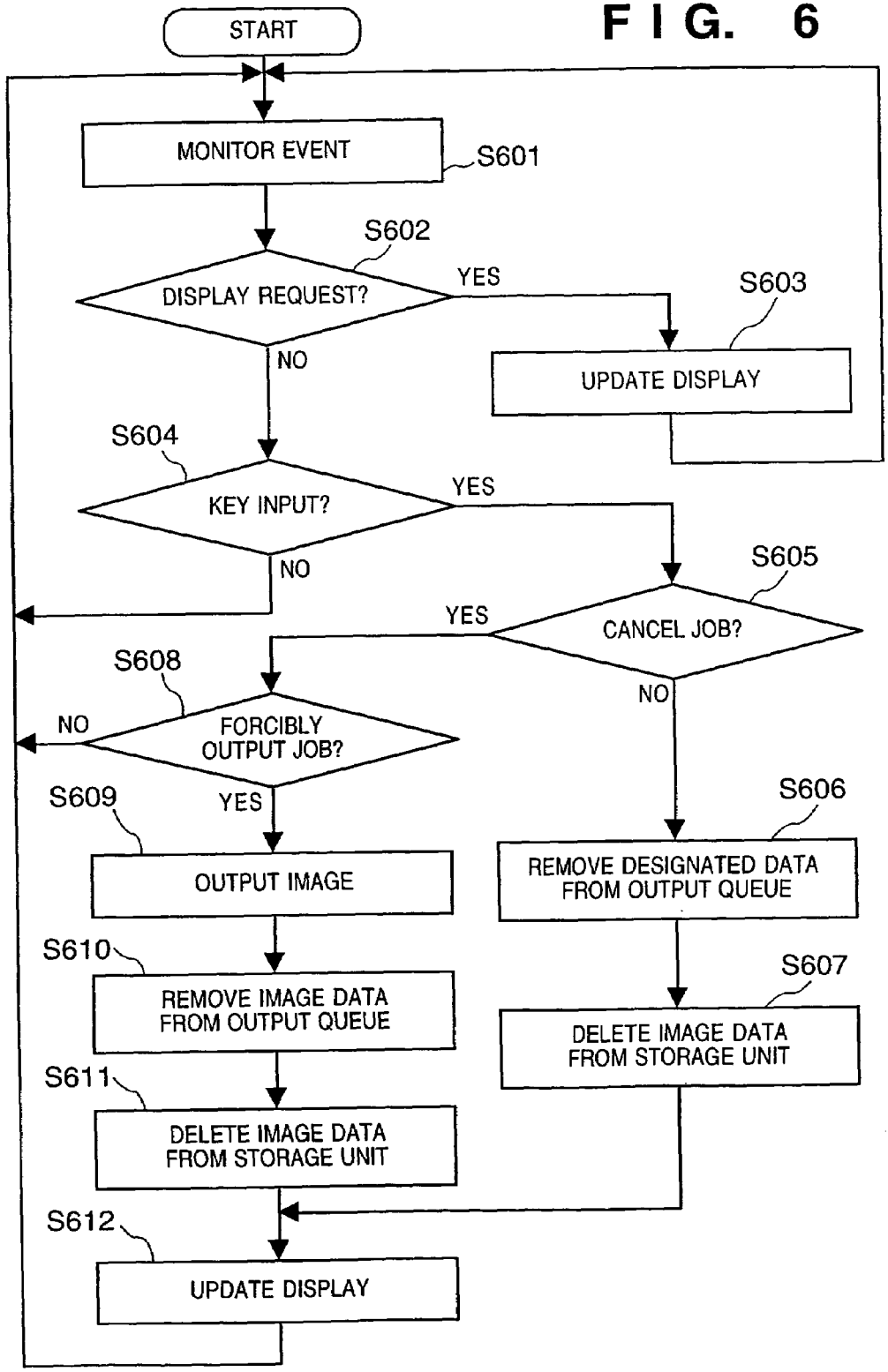
FIG. 6 is a flow chart of a user interface control procedure in the first embodiment of the present invention.

FIG. 6 is a flow chart of a user interface control procedure. An event is monitored in S601, and whether or not an output queue display request has occurred is checked in S602. If YES in S602, the flow shifts to S603; if NO, to S604. If the flow shifts to S603, the contents of the requested output queue are displayed on the liquid crystal display 316 on the operation unit 102, and the display request is also sent to the personal computer/work station (PC/WS) 110 via the computer interface unit 107. The flow returns to S601 to monitor for subsequent action.

If the flow shifts to S604, whether or not the user performs a key input on the operation unit 102 or personal computer/work station (PC/WS) 110 is checked. If NO in S604, the flow returns to S601; if YES, to S605. In S605, whether or not the key input designates to cancel the job is checked. If YES in S605, the flow advances to S606; if NO, to S608.

If the flow advances to S606, the designated data is removed from the output queue, the stored image data is deleted from the hard disk 108 in S607, and the flow advances to S612. In S612, cancelling of the image is displayed on the liquid crystal display 316 on the operation unit 102, and on the personal computer/work station (PC/WS) 110 via the computer interface unit 107. The flow returns to S601 to monitor an image output request.

If the flow advances to S608, whether the key input in S604 designates to forcibly output the job is checked. If YES in S608, the flow shifts to S609; if NO, returns to S601.

If the flow shifts to S609, image data at the start of the queue is output, the output data is removed from the output queue in S610, and the stored image data is deleted from the hard disk 108 in S611. The flow advances to S612 to display on the liquid crystal display 316 on the operation unit 102 that an image has been outputted. The personal computer/work station (PC/WS) 110 is informed of this status via the computer interface unit 107. Then, the personal computer/work station (PC/WS) 110 displays a message to this effect. The flow returns to S601 to monitor an image output request.

Figure 7:
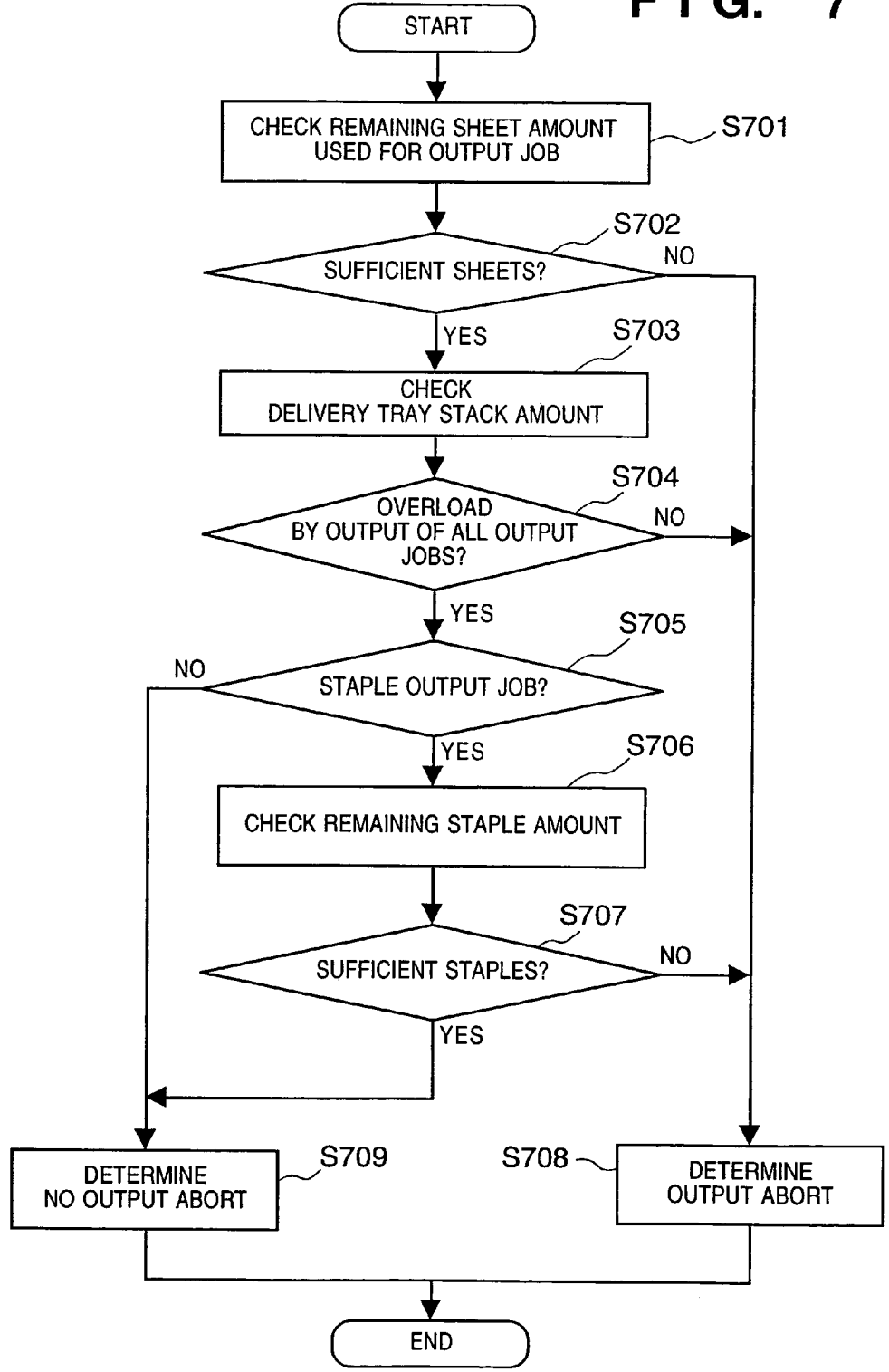
FIG. 7 is a flow chart of an output prediction control procedure in the first embodiment of the present invention.

FIG. 7 is a flow chart of an output prediction control procedure. If an output prediction request occurs, the number of sheets used by the output job, and the remaining sheet amounts in the cassettes 213 and 214 are checked in S701. Whether or not the remaining sheet amounts are sufficient is checked in S702. If YES in S702, the flow shifts to S703; if NO, to S708. In S703, the stack amount of the delivery tray in the sorter 220 is checked, and in S704 whether or not output of all image data of the output job would cause an overload is checked. If YES in S704, the flow shifts to S705; if NO, to S708. In S705, whether or not the output job uses the stapler of the sorter 220 is checked. If NO in S705, the flow shifts to S709; if NO, to S706. If the flow shifts to S706, the remaining amount of staple of the sorter 220 and the number of staples used by the output job are checked, and whether or not staples are sufficient for the output job is checked in S707. If YES in S707, the flow shifts to S709; if NO, to S708. In S708, the output prediction request source is informed that abort of the output job is determined. If the flow shifts to S709, the output prediction request source is informed that abort of the output job is not determined.

Note that the numbers of sheets and staples used in the output job are determined based on setting information of the output job.

As described above, according to the first embodiment, abort of an output job is predicted, and a job where abort is not predicted can be outputted preferentially to a job where abort is predicted. Therefore, the print efficiency can be enhanced.

Since a job set as an output reserve job and the reason are displayed on the user interface, the user can be informed that the output job as been placed as an output reserve job and the reason, thereof.

Further, the user can cancel an output-aborted job through the user interface. Thus, when the user cannot expect a desired output, the job can be cancelled to reduce wasteful consumption of,sheets or toner.

On the other hand, the user can forcibly output a job. When the user can quickly replenish a resource which has been the cause of output abort, the situation can be corrected and thereafter quickly attain the output job.

[Second Embodiment]

An image processing system to which an image processing method according to the present invention is applied will be described as the second embodiment of the present invention. In the first embodiment, when abort of a job output is predicted, a forcible output instruction is awaited, and if no instruction is inputted, the job is set as an output reserve job. To the contrary, the image processing system as the second embodiment can set in advance whether or not a job is forcibly output or postponed as an output reserve job. More specifically, the second embodiment is different from the first embodiment by the processing in S509 of FIG. 5 and the control procedure in FIG. 6. The remaining control procedures and hardware arrangement are the same as in the first embodiment, and a description thereof will be omitted.

Figure 8:
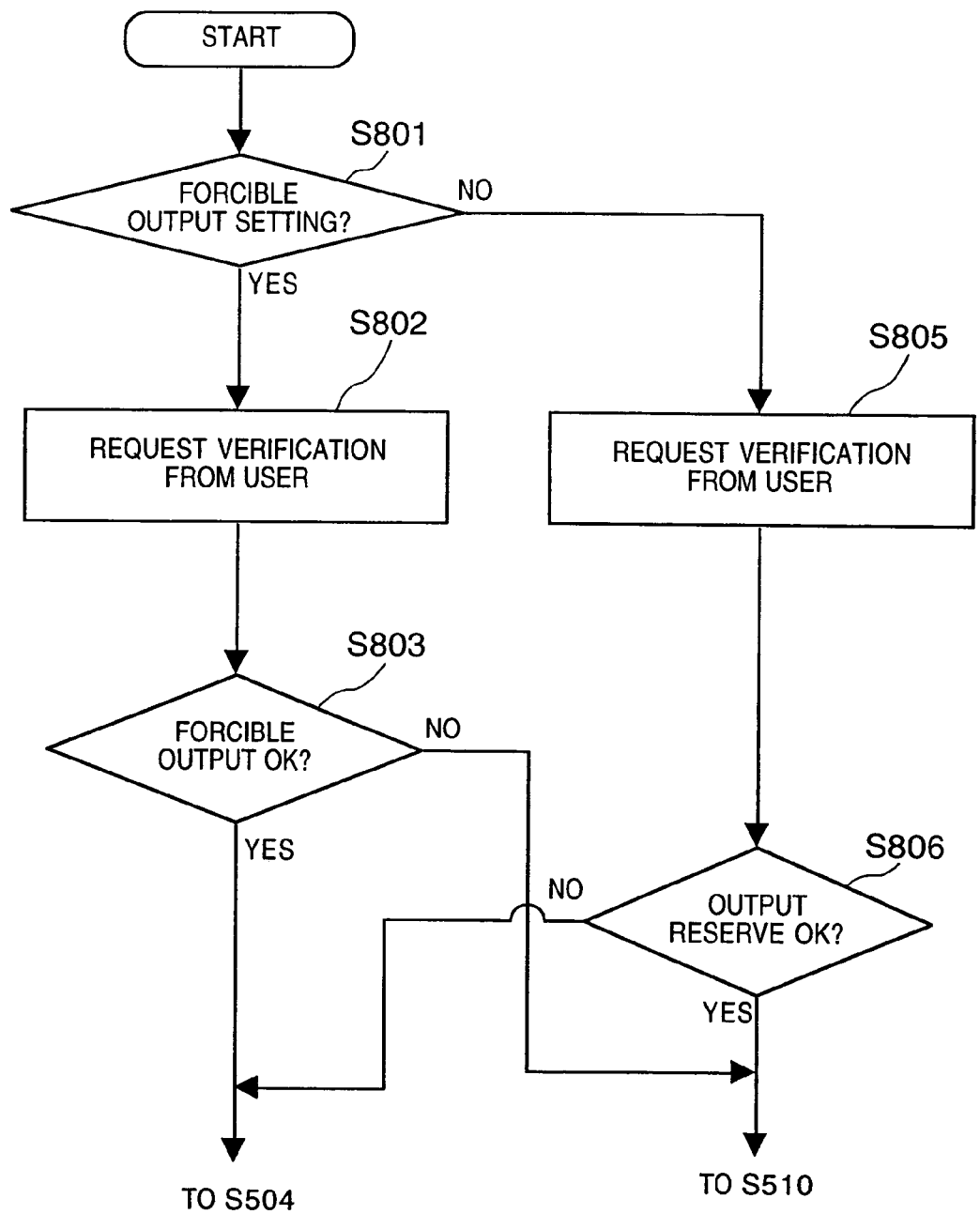
FIG. 8 is a flow chart of the detailed contents of processing in S509 of FIG. 5 in the second embodiment of the present invention.

FIG. 8 is a flow chart showing the detailed contents of processing in S509 of FIG. 5 in the second embodiment.

If abort of an output job is determined in S503 of FIG. 5, processing starts from S801 after the abort prediction is displayed (S508). In S801, the forcible output setting is determined. If the job is set to forcibly output setting, the flow shifts to S802; if the job is set as an output reserve job, to S805.

If the flow shifts to S802, verification as to whether or not to forcibly output the job is requested from the user on an operation unit 102 or personal computer/work station (PC/WS) 110, and verification is checked in S803. If YES in S803, the flow shifts to S504; if NO, to S510. If the flow shifts to S504, image output processing is done to output the image of the output job.

If the flow shifts to S805, verification as to whether or not to set the job as an output reserve job is requested from the user on the operation unit 102 or personal computer/work station (PC/WS) 110, and verification is checked in S806. If YES in S806, the flow shifts to S510; if NO, to S504. In S510, output reserve processing is done to set the output job as an output reserve job.

Figure 9:
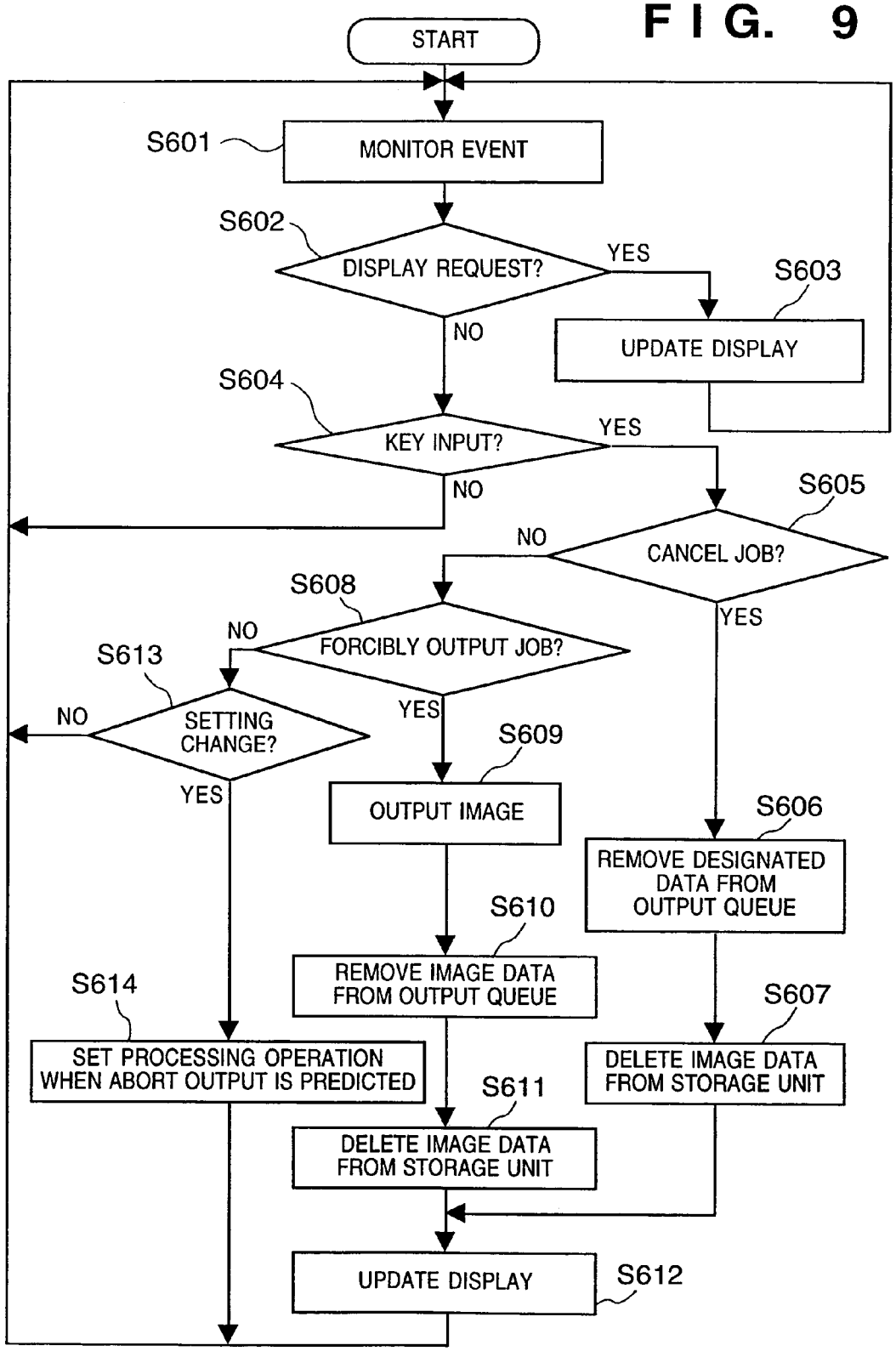
FIG. 9 is a flow chart of a user interface control procedure in the second embodiment of the present invention.

FIG. 9 is a flow chart showing a user interface control procedure in the second embodiment. The steps from S601 to S612 are the same as in FIG. 6. In S608, if the key input in S604 is determined as not to designate a forcible job output, the flow shifts to S613.

In S613, it is checked whether or not the key input designates a change in setting of processing operation when abort of the output job is predicted. If YES in S613, the flow advances to S614; if NO, returns to S601. In S614, processing operation when output abort is predicted is set to forcibly output the job or set the job as an output reserve job.

As described above, according to the second embodiment, whether a job is forcibly output or set as an output reserve job can be set in advance, and thus a more user-friendly environment can be established. That is, since processing operation, when output abort of an image is predicted, can be set, the user can obtain a desired output result even if output abort of the image occurs. Since processing operation, when output abort of an image is predicted, is verified via the user interface, the user can change processing every job to prevent an undesirable processing result.

[Third Embodiment]

An image processing system as the third embodiment of the present invention will be described. In the first embodiment, suspension prediction is done regardless of the number of elements in the output queue. In the third embodiment, when only one output queue element exists, an image is directly output without any abort prediction, and when a plurality of output queue elements exist, abort prediction is performed. The remaining arrangement, processing procedure, and the like are the same as in the first embodiment, and a description thereof will be omitted.

Figure 10:
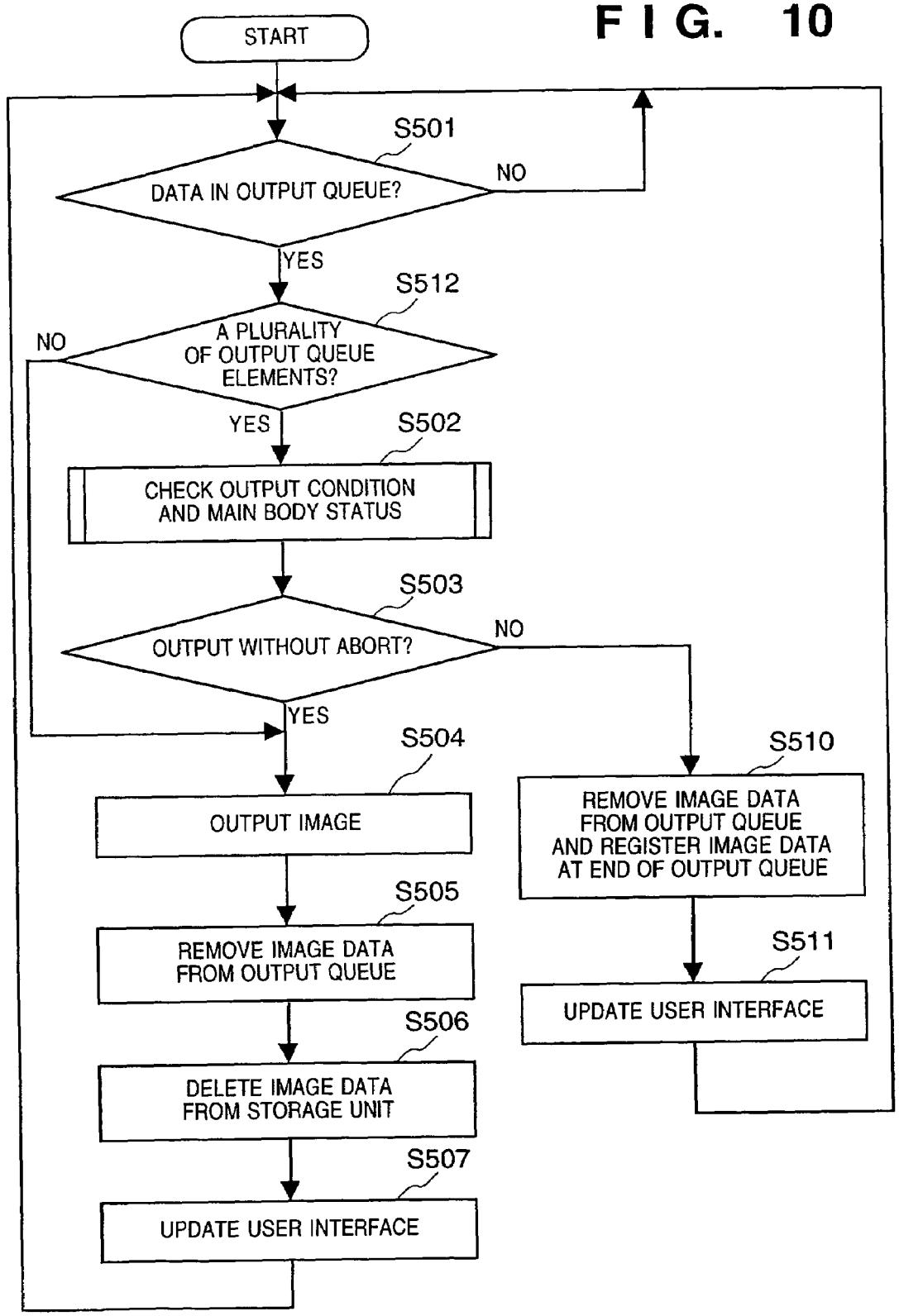
FIG. 10 is a flow chart of an image processing procedure in an image processing system according to the third embodiment of the present invention.

FIG. 10 is a flow chart showing an image processing procedure in the image processing system of the third embodiment. In FIG. 10, the same processes are done in the same steps as in FIG. 5. In S501, data added to an output queue is monitored. If data exists in the queue, the flow shifts to S512 to check whether or not a plurality of such data exist in the queue. If YES in S512, the flow shifts to S502 to perform abort prediction processing; if NO, to S504 to output the corresponding image data in the queue. In S503, it is checked based on data in S502 and the detection results of various sensors whether or not the output job is likely to abort due to the absence of staples or sheets, overload of the delivery tray, or the like.

If YES in S503, the flow shifts to S504; if NO, to S508. The remaining processing is the same as in FIG. 5, and a description thereof will be omitted.

If NO in S503, the flow may jump to S510 skipping S508 and S509 to always set the job as an output reserve job.

According to the third embodiment, when only one output waiting job exists, no abort prediction is done. Abort prediction can be done only when abort is expected to trouble other jobs, resulting in efficient processing.

[Other Embodiments]

The present invention may be applied to a system constituted by a plurality of devices (e.g., a host computer, an interface device, a reader, and a printer) or an apparatus comprising a single device (e.g., a copying machine, or a facsimile apparatus).

In the above embodiments, the program of processing in each flow chart is stored in the program memory of the control unit 109. However, the object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, program codes corresponding to the above-described flow charts are stored in this storage medium. This will be briefly described. At least program codes of a program mode of the detection step of detecting the state of a resource used to output an image, a program module of the prediction step of predicting abort/non-abort of output of image data in accordance with the state of the resource detected in the detection step, and a program module of the output step of suspending output of image data, abort of which is predicted in the prediction step are stored in the storage medium.

The image processing apparatus according to the present invention can suspend output of image data, abort of which is predicted owing to the absence of sheets or staples, overload of the delivery tray, or the like. When output conditions are satisfied, the output can restart. As a result, the copy or printout efficiency can be enhanced to decrease the number of output jobs that are abandoned because of undesirable outputs.

Since image data is stored, it can be easily, quickly output.

The present invention has been exemplified by preferred embodiments, but is not limited to the above embodiments, and can be variously modified within the spirit and scope of the invention.

As many apparently widely different embodiments of the present invention can be made without departing from the spirit and scope thereof, it is to be understood that the invention is not limited to the specific embodiments thereof except as defined in the appended claims.

The invention claimed is:

1. An image processing apparatus comprising:
a storage unit, adapted to store a plurality of job data that includes at least a first job data which is input before a second job data;
a print unit, adapted to print data stored in said storage unit;
a notify control unit, adapted to cause an user interface unit to notify an information concerning status of the image processing apparatus;
a selector, adapted to enable, after the information is notified by user interface unit, a selection of one of a first sequence for causing said print unit to start a print operation of the second job data before a print operation of the first job data of the storage unit is started and second sequence for causing said print unit to start the print operation of the second job data after the print operation of the first job data is finished; and
a controller, adapted to cause the image processing apparatus to perform the sequence selected by said selector of the first sequence and the second sequence when status of the image processing apparatus is a status in which said print unit can not finish the print operation of the first job data and cause the image processing apparatus to perform the second sequence of the first sequence and the second sequence when status of the image processing apparatus is a status in which said print unit can finish the print operation of the first job data.

2. A job processing method for an image processing apparatus that comprises a storage unit adapted to store a plurality of job data that includes at least a first job data which is input before a second job data and comprises a print unit adapted to print job data stored in said storage unit, the said method comprising:
a notify control step of causing an user interface unit to notify an information concerning status of the image processing apparatus;
an input step of enabling an inputting of request concerning an instruction to select one of a first sequence for causing said print unit to start a print operation of the second job data before a print operation of the first job data of the storage unit is started and second sequence for causing said print unit to start the print operation of the second job data after the print operation of the first job data is finished, after the information is notified; and
a control step of causing the image processing apparatus to process the second job data in the sequence selected by the instruction of the first sequence and the second sequence when a status of the image processing apparatus is a status in which said print unit can not finish the print operation of the first job data and causing the image processing apparatus to process the second job data in the second sequence of the first sequence and the second sequence when a status of the image processing apparatus is a status in which said print unit can finish the print operation of the first job data.

3. The method according to claim 2, wherein the image processing apparatus can print, via said storage unit, at least one of a job data output from a scanning unit and a job data output from a computer.

4. The method according to claim 2, wherein the image processing apparatus has a plurality of functions including a copy function for causing said print unit to print, via said storage unit, a job data output from a scanning unit and a print function for causing said print unit to print, via said storage unit, a job data output from a computer.

5. The method according to claim 2, wherein the control step causes the image processing apparatus to process the second job data in the sequence selected by the instruction of the first sequence and the second sequence, at least one of a case where said print unit can not finish the print operation of the first job data because of a status of the image processing apparatus related to a sheet used in the print operation of the first job data and a case where said print unit can not finish the print operation of the first job data because of a status of the image processing apparatus related to a stack unit stacking the sheets on which the first job data is printed and a case where said print unit can not finish the print operation of the first job data because of a status of the image processing apparatus related to a stapling process to the sheets on which the first job data is printed.

6. The method according to claim 2, wherein the image processing apparatus can print, via said storage unit, at least one of a job data output from a scanning unit and a job data output from a computer, and the request in said input step is input, via an operating unit of the image processing apparatus as said user interface unit.

7. The method according to claim 2, wherein the image processing apparatus can print, via said storage unit, at least one of a job data output from a scanning unit and a job data output from a computer, and the request in said input step is input, via an operating unit of the computer as said user interface unit.

8. The method according to claim 2, wherein the image processing apparatus can print, via said storage unit, at least one of a job data output from a scanning unit and a job data output from a computer, and in said notify control step it is noted to an operator by an operation unit in either the image processing apparatus or the computer as said user interface unit that the first job data is not able to be completely printed.

9. The method according to claim 2, wherein the control step causes said print unit, by priority, to start the print operation of the second job data, before a start of print operation of the first job data of print waiting state, in the first sequence.

10. The method according to claim 2, wherein the control step causes said print unit to start the printing operation of the first job data in the second sequence, even if a problem which interrupts the printing operation of the first data occurs in the image processing apparatus, when a status of the image processing apparatus is a status in which said print unit can not finish the print operation of the first job data.

11. The method according to claim 2, wherein said control step causes said storage unit to store the first job which is not finished to print because of performing the first sequence, and wherein an erasing process for erasing the first job data stored in said storage unit and an printing process for printing the first job data stored in said storage unit are able to be selectively performed based on an instruction from an operating unit after finishing the printing operation of the second job data.

12. A computer readable storage medium storing a program for causing a computer to perform a job processing method for an image processing apparatus that comprises a storage unit adapted to store a plurality of job data that includes at least a first job data which is input before a second job data and comprises a print unit adapted to print job data stored in said storage unit, the program comprising the steps of:
  a notify control step of causing an user interface unit to notify an information concerning status of the image processing apparatus;
  an input step of enabling an inputting of request concerning an instruction to select one of a first sequence for causing said print unit to start a print operation of the second job data before a print operation of the first job data of the storage unit is started and second sequence for causing said print unit to start the print operation of the second job data after the print operation of the first job data is finished, after the information is notified; and
  a control step of causing the image processing apparatus to process the second job data in the sequence selected by the instruction of the first sequence and the second sequence when a status of the image processing apparatus is a status in which said print unit can not finish the print operation of the first job data and causing the image processing apparatus to process the second job data in the second sequence of the first sequence and the second sequence when a status of the image processing apparatus is a status in which said print unit can finish the print operation of the first job data,
  wherein the image processing apparatus can print, via said storage unit, at least one of a job data output from a scanning unit and a job data output from a computer, and the request in said input step is input, via an operating unit of the computer as said user interface unit.

13. The apparatus according to claim 1, wherein the image processing apparatus can print, via said storage unit, at least one of a job data output from a scanning unit and a job data output from a computer.

14. The apparatus according to claim 1, wherein the image processing apparatus has a plurality of functions including a copy function for causing said print unit to print, via said storage unit, a job data output from a scanning unit and a print function for causing said print unit to print, via said storage unit, a job data output from a computer.

15. The apparatus according to claim 1, wherein the controller causes the image processing apparatus to process the second job data in the sequence selected by said selector of the first sequence and the second sequence, at least one of a case where said print unit can not finish the print operation of the first job data because of a status of the image processing apparatus related to a sheet used in the print operation of the first job data and a case where said print unit can not finish the print operation of the first job data because of a status of the image processing apparatus related to a stack unit stacking the sheets on which the first job data is printed and a case where said print unit can not finish the print operation of the first job data because of a status of the image processing apparatus related to a stapling process to the sheets on which the first job data is printed.

16. The apparatus according to claim 1, wherein the image processing apparatus can print, via said storage unit, at least one of a job data output from a scanning unit and a job data output from a computer, wherein said selector selects the sequence based on an users setting in an operating unit of the image processing apparatus as said interface unit.

17. The apparatus according to claim 1, wherein the image processing apparatus can print, via said storage unit, at least one of a job data output from a scanning unit and a job data output from a computer, and wherein said selector selects the sequence based on an users setting in an operating unit of the computer as said user interface unit.

18. The apparatus according to claim 1, wherein the image processing apparatus can print, via said storage unit, at least one of a job data output from a scanning unit and a job data output from a computer, and wherein said notify control unit notifies it is noted to an operator by an operation unit in either the image processing apparatus or the computer as said user interface unit that the first job data is not able to be completely printed.

19. The apparatus according to claim 1, wherein the controller causes said print unit, by priority, to start the print operation of the second job data, before a start of print operation of the first job data of print waiting state, in the first sequence.

20. The apparatus according to claim 1, wherein the controller causes said print unit to start the printing operation of the first job data in the second sequence, even if a problem which interrupts the printing operation of the first data occurs in the image processing apparatus, when a status of the image processing apparatus is a status in which said print unit can not finish the print operation of the first job data.

21. The apparatus according to claim 1, wherein said controller causes said storage unit to store the first job data which is not finished to print because of performing the first sequence, and wherein an erasing process for erasing the first job data stored in said storage unit and an printing process for printing the first job data stored in said storage unit are able to be selectively performed based on an instruction from an operating unit after finishing the printing operation of the second job data.

22. An image processing apparatus comprising:
a storage control unit, adapted to cause a storage unit, which can store a plurality of job data that includes at least a first job data which is input before a second job data, to store job data to be printed;
a print unit, adapted to print job data stored in said storage unit;
a controller adapted to, cause the image processing apparatus to allow, selectively, an execution of the a first sequence for causing said print unit to start a print operation of the second job data before a print operation of the first job data of the storage unit is started and an execution of a second sequence for causing said print unit to start the print operation of the second job data after the print operation of the first job data is finished, when status of the image processing apparatus is a status in which said print unit can not finish the print operation of the first job data and a plurality of job data to be printed are stored in said storage unit, and cause the image processing apparatus to allow an execution of the second sequence, no matter whether status of the image processing apparatus is the status in which said print unit can not finish the print operation of the first job data, when a plurality of job data to be printed are not stored in said storage unit.

23. A job processing method for an image processing apparatus that comprises a storage unit adapted to store a plurality of job data that includes at least a first job data which is input before a second job data and comprises a print unit adapted to print job data stored in said storage unit, the said method comprising:
a storage control step of causing said storage unit to store job data to be printed; and
a control step of causing the image processing apparatus to allow, selectively, an execution of a first sequence for causing said print unit to start a print operation of the second job data before a print operation of the first job data of the storage unit is started and an execution of a second sequence for causing said print unit to start the print operation of the second job data after the print operation of the first job data is finished, when status of the image processing apparatus is a status in which said print unit can not finish the print operation of the first job data and a plurality of job data to be printed are stored in said storage unit, and causing the image processing apparatus to allow an execution of the second sequence, no matter whether status of the image processing apparatus is the status in which said print unit can not finish the print operation of the first job data, when a plurality of job to be printed are not stored in said storage unit.

24. The method according to claim 23, wherein the image processing apparatus can print, via said storage unit, at least one of a job data output from a scanning unit and a job data output from a computer,
wherein the control step causes the image processing apparatus to perform the selected sequence based on an instruction input via at least one of an operation unit of the image processing apparatus and an operation unit of the computer, when status of the image processing apparatus is a status in which said print unit can not finish the print operation of the first job data and a plurality of job data to be printed are stored in said storage unit.

25. The method according to claim 23, wherein the control step causes said print unit to start the printing operation of the first job data, even if a problem which interrupts the printing operation of the first data occurs in the image processing apparatus, when a plurality of job data to be printed are not stored in said storage unit.

26. A computer readable storage medium storing a program for causing a computer to perform a job processing method for an image processing apparatus that comprises a storage unit adapted to store a plurality of job data that includes at least a first job data which is input before a second job data and comprises a print unit adapted to print job data stored in said storage unit, the said method comprising the steps of:
a storage control step of causing said storage unit to store job data to be printed; and
a control step of an execution of a first sequence for causing said print unit to start a print operation of the second job data before a print operation of the first job data of the storage unit is started and an execution of a second sequence for causing said print unit to start the print operation of the second job data after the print operation of the first job data is finished, when status of the image processing apparatus is a status in which said print unit can not finish the print operation of the first job data and a plurality of job data to be printed are stored in said storage unit, and causing the image processing apparatus to allow an execution of the second sequence, no matter whether status of the image processing apparatus is the status in which said print unit can not finish the print operation of the first job data, when a plurality of job to be printed are not stored in said storage unit.

27. The apparatus according to claim 22, wherein the image processing apparatus can print, via said storage unit, at least one of a job data output from a scanning unit and a job data output from a computer,
wherein the controller causes the image processing apparatus to perform the selected sequence based on an instruction input via at least one of an operation unit of the image processing apparatus and an operation unit of the computer, when status of the image processing apparatus is a status in which said print unit can not finish the print operation of the first job data and a plurality of job data to be printed are stored in said storage unit.

28. The apparatus according to claim 22, wherein the controller causes said print unit to start the printing operation of the first job data, even if a problem which interrupts the printing operation of the first data occurs in the image processing apparatus, when a plurality of job data to be printed are not stored in said storage unit.

* * * * *

UNITED STATES PATENT AND TRADEMARK OFFICE
CERTIFICATE OF CORRECTION

PATENT NO. : 7,023,571 B2 Page 1 of 1
APPLICATION NO. : 10/900316
DATED : April 4, 2006
INVENTOR(S) : Bungo Shimada et al.

It is certified that error appears in the above-identified patent and that said Letters Patent is hereby corrected as shown below:

COLUMN 2:
Line 29, "abort/non-bort" should read --abort/non-abort--.

COLUMN 4:
Line 64, "coping" should read --copying--.
Line 66, "informs" should read --inform--.

COLUMN 7:
Line 16, "as" should read --has--.
Line 21, "of,sheets" should read --of sheets--.

COLUMN 11:
Line 39, "an" should read --a--.

COLUMN 13:
Line 11, "an" should read --a--.
Line 24, "the" should be deleted.

Signed and Sealed this

Seventh Day of November, 2006

JON W. DUDAS
*Director of the United States Patent and Trademark Office*